United States Patent [19]

Jotwani

[11] Patent Number: 4,573,151
[45] Date of Patent: Feb. 25, 1986

[54] INTERFACE UNIT FOR TELEPHONE SYSTEM HAVING REMOTE UNITS

[75] Inventor: Haresh C. Jotwani, Longwood, Fla.

[73] Assignee: Stromberg-Carlson Corp., Lake Mary, Fla.

[21] Appl. No.: 572,506

[22] Filed: Jan. 20, 1984

[51] Int. Cl.⁴ .................... H04Q 11/00; H04Q 11/04
[52] U.S. Cl. .......................................... 370/56; 370/58
[58] Field of Search ............................ 370/56, 58, 13

[56] References Cited

U.S. PATENT DOCUMENTS

| | | | |
|---|---|---|---|
| 4,007,338 | 2/1977 | McLaughlin | 370/56 |
| 4,357,701 | 11/1982 | Canniff | 370/56 |
| 4,385,379 | 5/1983 | Kelly et al. | 370/56 |

Primary Examiner—Douglas W. Olms
Assistant Examiner—Wellington Chin
Attorney, Agent, or Firm—Cesari and McKenna

[57] ABSTRACT

A telephony network for selectively transmitting voice and supervisory information among a plurality of subscriber lines. The network includes a central office including a switch and a plurality of remote modules each of which connects to several subscriber lines and multiplexes the voice and supervisory information onto a lesser number of highways for transmission to the central office. The central office and remote modules include an interface that connects to the highways and adjusts the format of the voice and supervisory information signals on the highways to the formats of such signals internal to the central office and remote modules, and transmits and receives control messages from and to a control processor at the central office and remote modules. The interface includes an interface module for each highway and redundant sets of control modules which include timing and other control circuitry and which connect to all of the interface modules in the interface.

14 Claims, 17 Drawing Figures

| | CONTROL BITS CHANNELS 0-23 | CONTROL BITS CHANNEL 30 | CONTROL BITS CHANNEL 31 | SENSE BITS CHANNELS 0-23 | SENSE BITS - CHANNEL 30 GP 0 | SENSE BITS - CHANNEL 30 GP 1 | SENSE BITS CHANNEL 31 |
|---|---|---|---|---|---|---|---|
| $\overline{F0}$ | $\overline{A}$ SIG | X | X | $\overline{A}$ SIG | — | — | |
| $\overline{F1}$ | $\overline{B}$ SIG | X | $\overline{SUPY\ TST}$ | $\overline{B}$ SIG | — | — | $\overline{SUPY\ TST}$ |
| $\overline{S0}$ | $\overline{TST\ RX}$ | $\overline{RTN\ TO\ SRCH}$ | X | ALARM | COM EQ ALM | COM EQ ALM | — |
| $\overline{S1}$ | $\overline{TST\ TX}$ | $\overline{ALM\ RST}$ | X | LOCK | $\overline{A/B}$ SEL | DSI FUSE | — |
| $\overline{S2}$ | $\overline{PAD\ A}$ | $\overline{LP\ BACK}$ | X | — | TST ALM | PWR SUP | — |
| $\overline{S3}$ | $\overline{PAD\ B}$ | $\overline{RMT\ LP\ BK}$ | X | — | SYNC LOSS | SYNC LOSS | — |
| $\overline{S4}$ | X | $\overline{TEST\ EN}$ | X | — | SLIP FRM | $\overline{X/Y}$ SEL | — |
| $\overline{S5}$ | X | SENSE GP $\overline{0/1}$ | X | — | CGA ALM | Y-ERROR | — |
| $\overline{S6}$ | X | $\overline{X/Y}$ SEL | X | — | BER-A | Y-ERROR | — |
| $\overline{S7}$ | X | $\overline{FRZ}$ | X | — | BER-B | PGH ALM | — |

FIG. 7

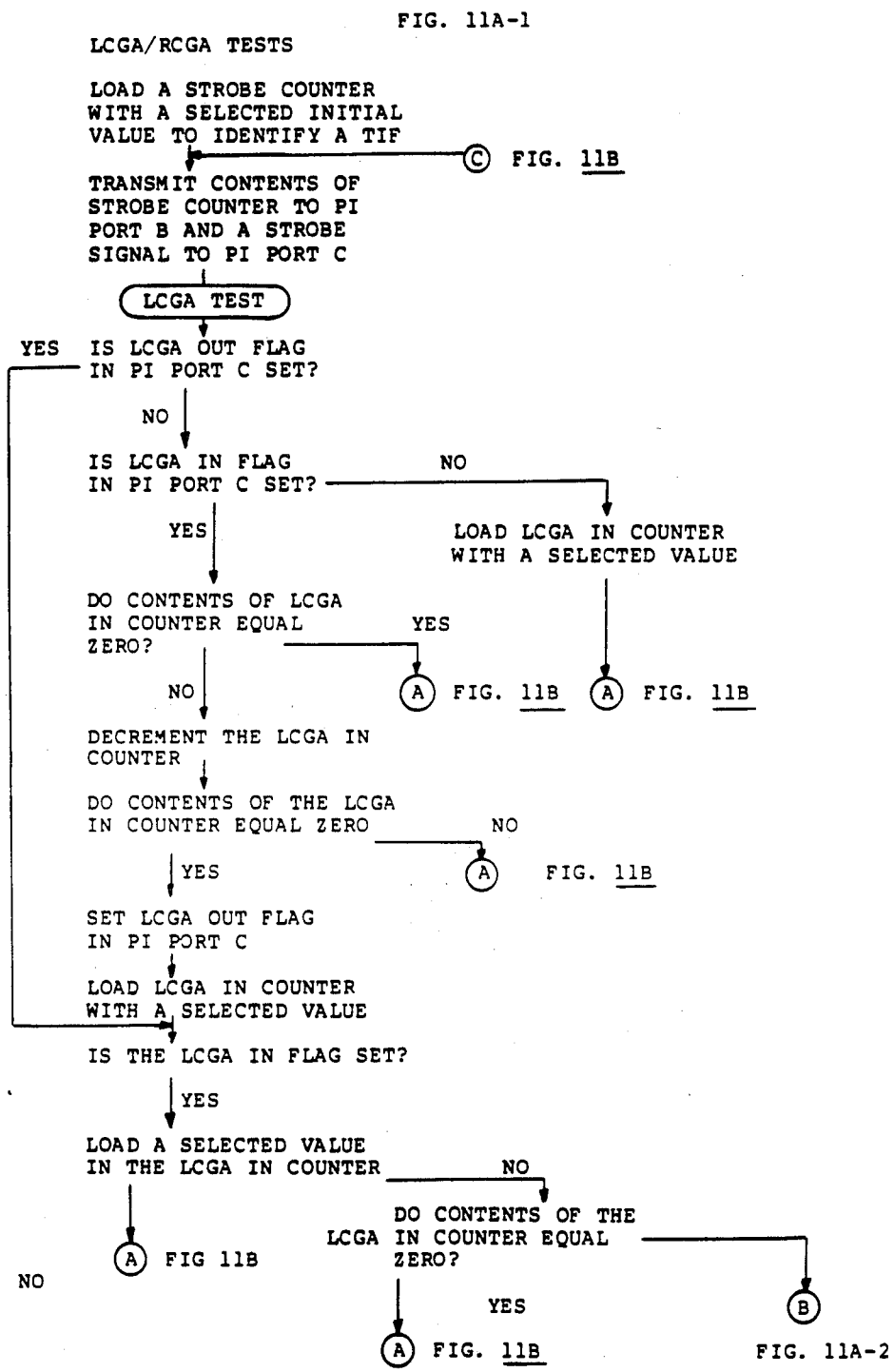

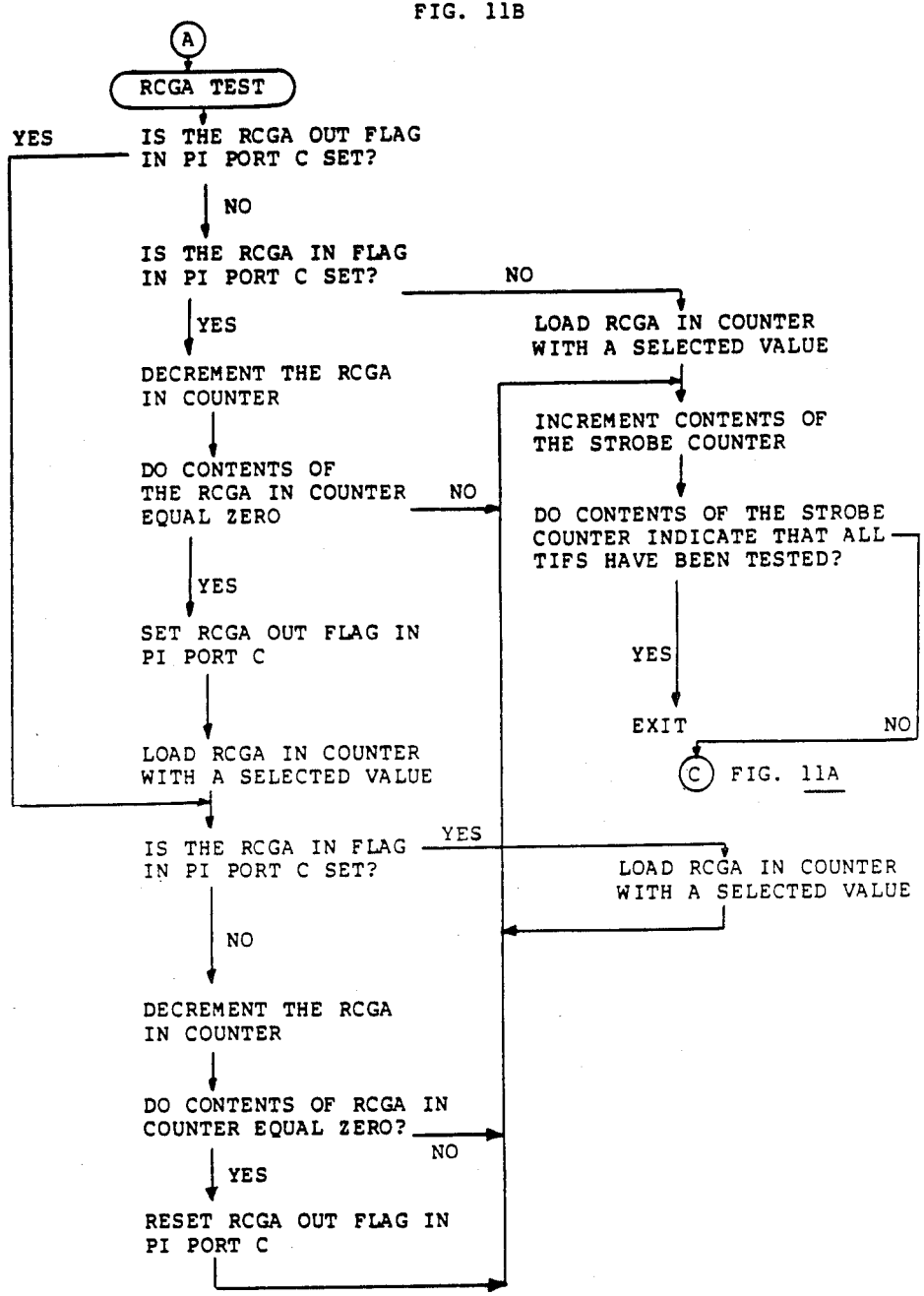

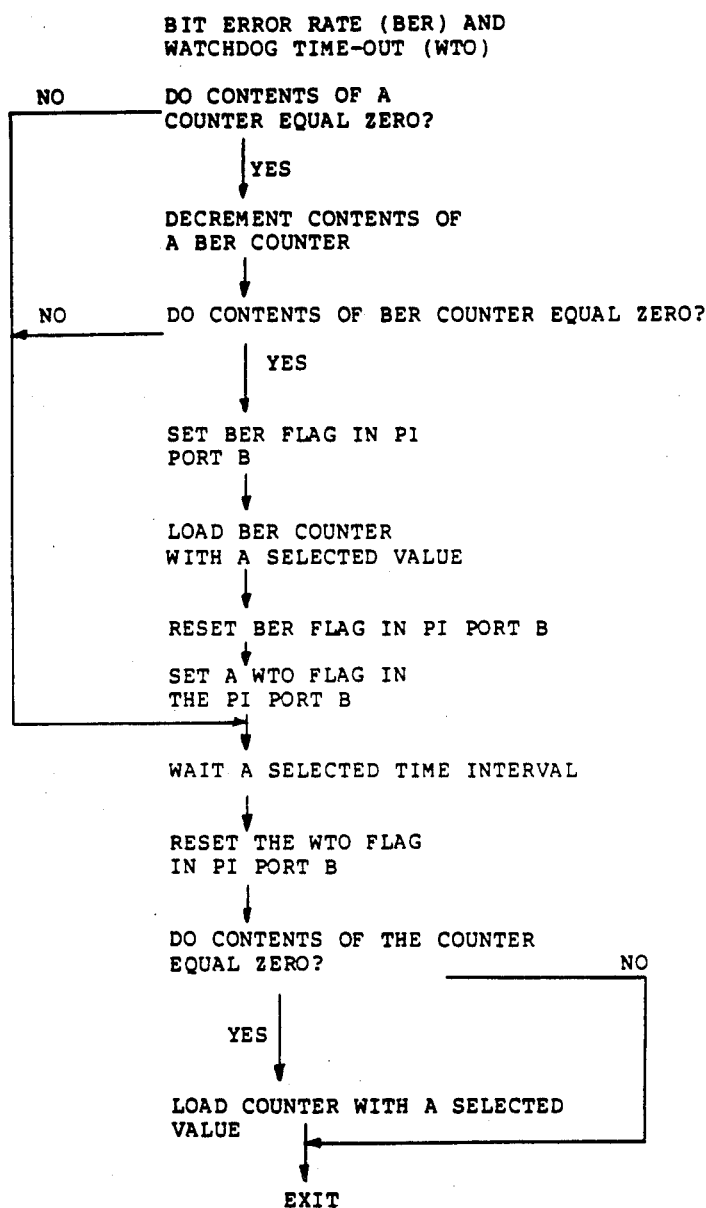

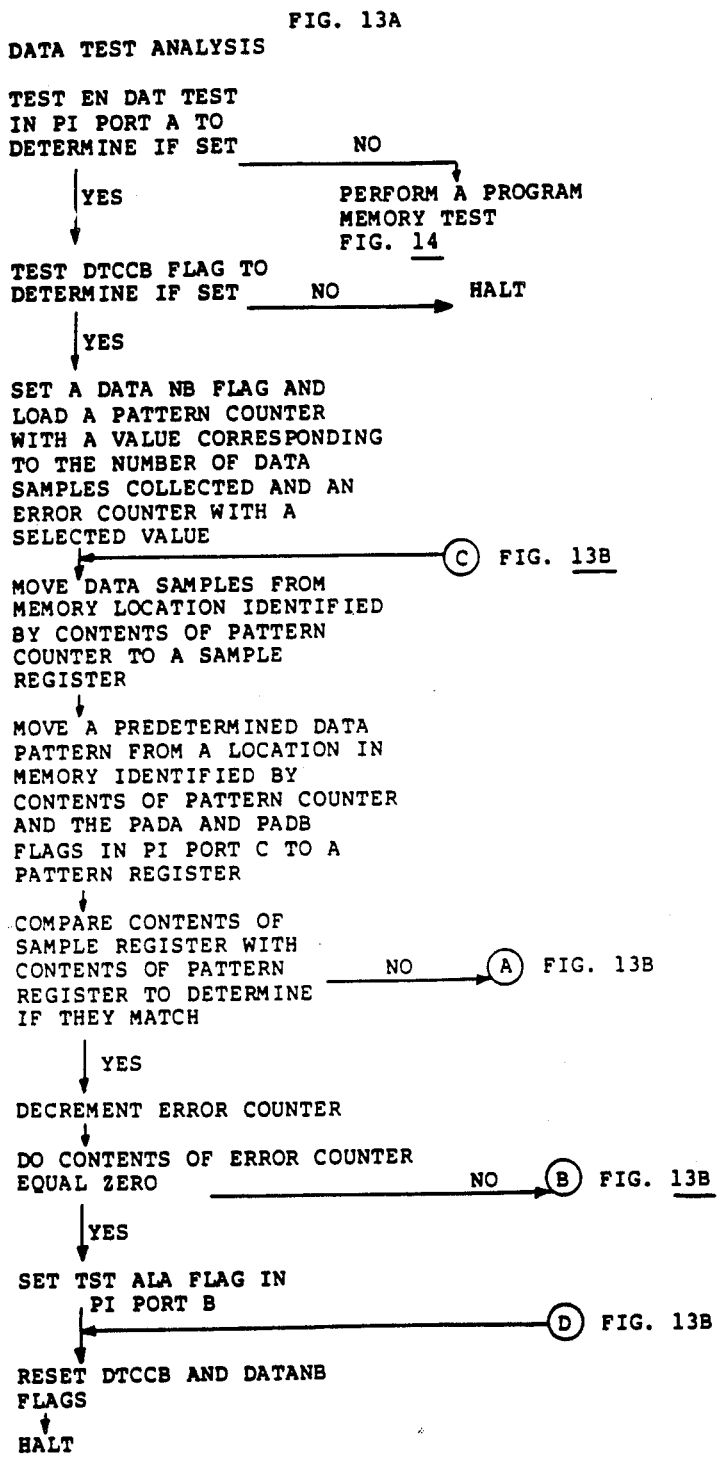

FIG. 13A
DATA TEST ANALYSIS

TEST EN DAT TEST
IN PI PORT A TO
DETERMINE IF SET ———NO———→ PERFORM A PROGRAM MEMORY TEST FIG. 14

↓ YES

TEST DTCCB FLAG TO
DETERMINE IF SET ———NO———→ HALT

↓ YES

SET A DATA NB FLAG AND
LOAD A PATTERN COUNTER
WITH A VALUE CORRESPONDING
TO THE NUMBER OF DATA
SAMPLES COLLECTED AND AN
ERROR COUNTER WITH A
SELECTED VALUE ←——————— (C) FIG. 13B

MOVE DATA SAMPLES FROM
MEMORY LOCATION IDENTIFIED
BY CONTENTS OF PATTERN
COUNTER TO A SAMPLE
REGISTER

↓

MOVE A PREDETERMINED DATA
PATTERN FROM A LOCATION IN
MEMORY IDENTIFIED BY
CONTENTS OF PATTERN COUNTER
AND THE PADA AND PADB
FLAGS IN PI PORT C TO A
PATTERN REGISTER

↓

COMPARE CONTENTS OF
SAMPLE REGISTER WITH
CONTENTS OF PATTERN ———NO———→ (A) FIG. 13B
REGISTER TO DETERMINE
IF THEY MATCH

↓ YES

DECREMENT ERROR COUNTER

↓

DO CONTENTS OF ERROR COUNTER
EQUAL ZERO ———NO———→ (B) FIG. 13B

↓ YES

SET TST ALA FLAG IN
PI PORT B ←——————— (D) FIG. 13B

↓

RESET DTCCB AND DATANB
FLAGS

↓

HALT

INTERFACE UNIT FOR TELEPHONE SYSTEM HAVING REMOTE UNITS

BACKGROUND OF THE INVENTION

1. Field of the Invention

This invention generally relates to telephony networks and, more specifically, to a telephony system that incorporates remote concentrators for multiplexing calls from a large number of telephone subscriber lines onto a substantially reduced number of highways for transfer to a central office switching network.

2. Description of the Prior Art

U.S. patent application Ser. No. 507,935, filed June 23, 1983, discloses a telephony network that includes a digital central office for performing telephone switching operations. In this network, telephone lines from subscribers and trunk circuits from other central offices connect directly to a digital central office through a plurality of line and trunk circuits in port group units. Each connection is made through conventional tip and ring, or similar, conductors that extend from each individual subscriber or remote central office to the location of the digital central office. These conductors carry signals in analog form that represent voices or other subscriber information, herein generally referred to as voice information, and supervisory information. The supervisory information is used to control the telephony network itself, and may be "sense supervisory" information, which includes hook status and dial pulse information received from the subscriber line, or "control supervisory" information, which includes ringing and other control signals that are sent to the subscriber line or that cause certain operations to be performed in connection with the subscriber line.

Each port group unit in the central office described in U.S. patent application Ser. No. 507,935 connects directly to a plurality of telephone subscriber lines through individual port circuits, such as line or trunk circuits. Each port circuit converts incoming analog voice signals to digital form, and the digital signals are transferred in a serial pulse train and multiplexed onto a port group highway with signals from other subscriber lines. Sense supervisory information, in digital form, is also multiplexed onto this pulse train. A time slot interchange (TSI) matrix switching network receives the pulse train and strips the incoming sense supervisory information for storage in an area of a port data store that is assigned to each port circuit. A port event processor samples the information in each port data store area, processes the information and uses it to send messages to a call control processor. The call control processor sends information, including commands, to the individual areas of the port data store for enabling the port event processor to control the corresponding telephone subscriber line and to the TSI matrix network for establishing a switching channel through the network to establish a path for the digitized voice signals to the port serving a called subscriber line.

Commands to the port event processor from the call control processor enable the transmission of a dial tone, termination of a dial tone, or ringing signals to be applied to the calling and called subscriber lines. The port event processor generates control supervisory information in response to these commands. The control supervisory information is multiplexed with the voice information in digital form for transmission to the port group unit connected to the port group highway. Then the corresponding port group unit performs various functions in response to the commands and converts the digital voice data signals into analog form for transmission through a particular port circuit to the subscriber's telephone lines.

Telephony networks of this type require individual telephone lines from each subscriber location to the location of the digital central office. This approach works well and is economical where the subscribers either are located in a relatively small geographical area around the central office, or are randomly, but widely, dispersed in an area centered around the digital office. However, it often occurs that telephone subscribers are located in clusters that are geographically remote from the central office. For example, subscribers may live in small towns in a rural setting, or in apartment houses in an urban setting.

In such situations, in the system described in Application Ser. No. 507,935, a line must be strung from the central office to each remote subscriber's location. This line may include not only cabling, but also gain devices such as amplifiers, for each subscriber line. The expense of the additional cabling is readily apparent, especially in view of the fact that in many such situations the traffic volume in such remote networks, as a percentage of the maximum traffic capacity which the lines could carry, is very low. Thus, the actual utilization of the telephone lines can become quite expensive and inefficient.

One approach, which is disclosed in U.S. Pat. No. 4,393,495, is to place remote port units at the center of subscriber clusters and establish a reduced number of communications links between the clusters and the central office. One problem with such an arrangement is that, as traffic increases, the number of lines between the remote port unit and the central office remains fixed. Therefore, as traffic increases, additional entire remote port units must be established to carry the additional traffic.

Further problems arise from the system as described in U.S. Pat. No. 4,393,495. In that system, the functions at each interface, that is, the functions performed by the various interfaces to the communications links, are totally duplicated, notwithstanding the fact that several of the functions are common and thus can be performed by a module common to a number of the links. If redundant modules are provided, as is often the case, the duplication is increased even more, adding to the cost of the system. Further, the diagnostic capability of the interface is quite limited, as the portion of the interface devoted to diagnostic operations also performs other functions, such as translation of messages between the remote units and the central office.

SUMMARY OF THE INVENTION

In accordance with this invention, one or more remote concentrators is connected to a central office through an interface that connects telephone calls over one or more communications links through a time slot interchange matrix network switch at a central office. The communications links also transfer supervisory information between a controller located on the remote concentrator and the central office's call control processor.

The interface at each end of a communications link includes an interface module, which couples the signals between the communications link and a highway resident in the central office or remote concentrator, and a set of two control modules. One control module centralizes a number of common timing functions into one common circuit, thereby reducing the amount of circuitry required for such functions. The second control module performs diagnostic operations and inserts control and status messages into selected lines for transmission to a selected remote concentrator.

BRIEF DESCRIPTION OF THE DRAWINGS

This invention is pointed out with particularity in the appended claims. The above and further objects and advantages of this invention may be better understood by referring to the following detailed description, taken in conjunction with the accompanying drawings, in which:

FIG. 7 is a table depicting a number of control and sense supervisory signals transmitted between various elements of the telephony network depicted in FIG. 1; and FIGS. 8 through 14 are flow diagrams depicting various control and diagnostic operations performed by the control module depicted in FIGS. 4 and 5.

DESCRIPTION OF THE PREFERRED EMBODIMENTS

I. In General

A. Telephony Network

Figure 1:
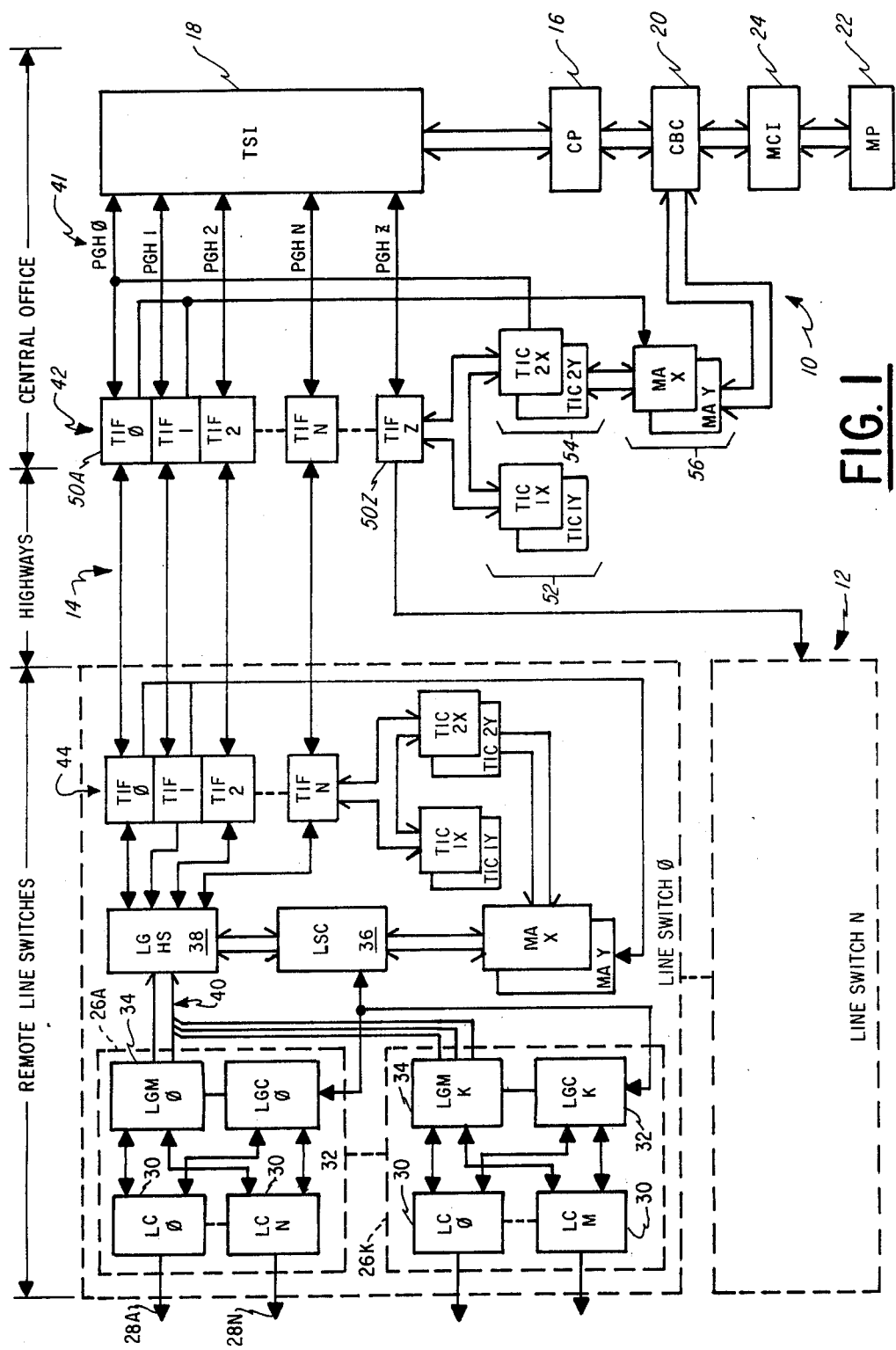
FIG. 1 is a block diagram of a telephony network constructed in accordance with this invention.

FIG. 1 depicts a telephony network system that includes a central office 10 connected to one or more remote concentrators such as remote line switches 12 over communications links comprising highways 14. The central office 10 may be as depicted in the aforementioned U.S. patent application Ser. No. 507,935 and U.S. Pat. No. 4,393,495. A call control processor 16 controls the call processing operations of the system. A time slot interchange matrix switch network 18, under control of call control processor 16, performs line and trunk switching operations. The call control processor 16 also transmits and receives control and sense supervisory information with the rest of the system through, for example, the switch 18 and a communications buffer controller 20.

As is common in telephony systems, certain elements of the system may be duplicated or redundant so that if one of the redundant elements fails, the other redundant element may take over. A maintenance processor 22, which connects to the rest of the central office through a maintenance communications interface 24, initiates and performs maintenance and diagnostic operations on the system and detects when one of the redundant elements fails. The maintenance processor can cause the redundant element to substitute for a failed element, in some instances may take certain corrective action, and also provides certain diagnostic information to a maintenance repairman.

Each remote line switch 12 includes a plurality of line groups 26a through 26k, each of which connects to a plurality of subscriber lines 28a through 28n. In one specific embodiment, a maximum of ninety subscriber lines may be connected to one line group, and a maximum of twelve line groups can be included in one remote line switch 12. Each subscriber line is connected to a line card, which is generally indicated by the reference numeral 30, which converts the analog voice signal to a digital pulse code modulated (PCM) signal for transmission to the rest of the telephony system, and converts the digital PCM signal received from the telephony system into an analog signal for transmission over the subscriber line. Line card 30 also detects when a subscriber's receiver goes on- and off-hook, and sends signals indicating the occurrence of these events to a line group controller 32. The digitized voice information is transferred directly to and from a line group multiplexer 34, which is under control of the line group controller 32.

The line group controller transfers messages to a line switch controller 36 informing it of the on- and off-hook condition of the lines, and receives messages from the line switch controller 36 which, for example, cause the line group multiplexer 34 to establish or eliminate paths through the remote line switch for lines that have gone off- or on-hook. The line switch controller 36 also generates and transmits messages to the call control processor 16 in central office 10 over highways 14 and through communications buffer controller 20, in response to the messages from the line group controllers 32. The line switch controller 36 also receives messages from the call control processor 16 over interface 14, and through communications buffer controller 20, and in turn may generate other messages in response thereto for transmission to the line group controllers 32 to cause certain actions, such as ringing, to occur on the subscriber lines.

In addition, the line switch controller 36 controls a line group highway switch 38 which receives the digitized voice information signals in specified time slot channels from the line group multiplexers 34, specifically from line group highways 40 connected to the line group multiplexers, and transfers them over a "send" path to specified port group highways 40 for transfer to the time slot interchange matrix switch network 18 at the central office 10. The line group highway switch 38 also receives the digitized voice information signals from the time slot interchange matrix switch network 18 and distributes them over a "receive" path to the respective line group multiplexers 34 over line group highways 40. One specific embodiment of a remote line switch 12 is further described in U.S. patent application Ser. No. 427,513, filed Sept. 29, 1982, and assigned to the assignee of the instant invention.

B. Interface 42

As has been mentioned, the highways 14 transfer voice and supervisory signals between the central office 10 and the remote line switch 12. The central office 10 includes an interface 42 which receives the voice and supervisory signals from switch 18 by way of a plurality of port group highways 41, alters the format and timing of the signals, and transmits the reformatted signals onto highways 14. Interface 42 also receives the voice and supervisory signals from highways 14, and transmits them onto port group highways 41 with the appropriate timing and format. Each remote line switch 12 also includes an interface 44 which performs analogous operations for the remote line switch, between highways 14 and line group highway switch 38. Since the structure and operation of interface 44 are similar to the structure and operation of interface 42, only interface 42 will be described in detail.

Interface 42 includes one or more interface modules 50A through 50Z (which are generally identified herein by the reference numeral 50) and a set of control modules 52 and 54. In accordance with one aspect of the invention, the central office 10 can include redundant sets of control modules 52 and 54, without the necessity of providing a redundant set of interface modules 50 for each line. Since the control modules in each set uses one set of control circuitry to perform functions which have heretofore been duplicated for each interface module, the savings in cost of the interface 42 is evident, even with the redundant sets of control modules. One of the redundant sets of control modules is denominated "X" and the other "Y".

The interface 42 further includes a message assembler 56 which couples control messages between control module 54 and communications buffer controller 20. The message assembler 56 is also connected to several of the interface modules 50 and receives messages from highways 14 which originate from the remote line switches 12. The received messages are transmitted by the message assembler 56 to the communications buffer controller 20 for transmission to either the call control processor 16 or the maintenance processor 22. Redundant message assemblers may also be provided.

Other portions of the telephony network may also be duplicated or redundant. Since the redundant elements in interface 42 are essentially identical, with any differences relating to the selection of which element is online, only one set of redundant elements will be described below.

Figure 2:
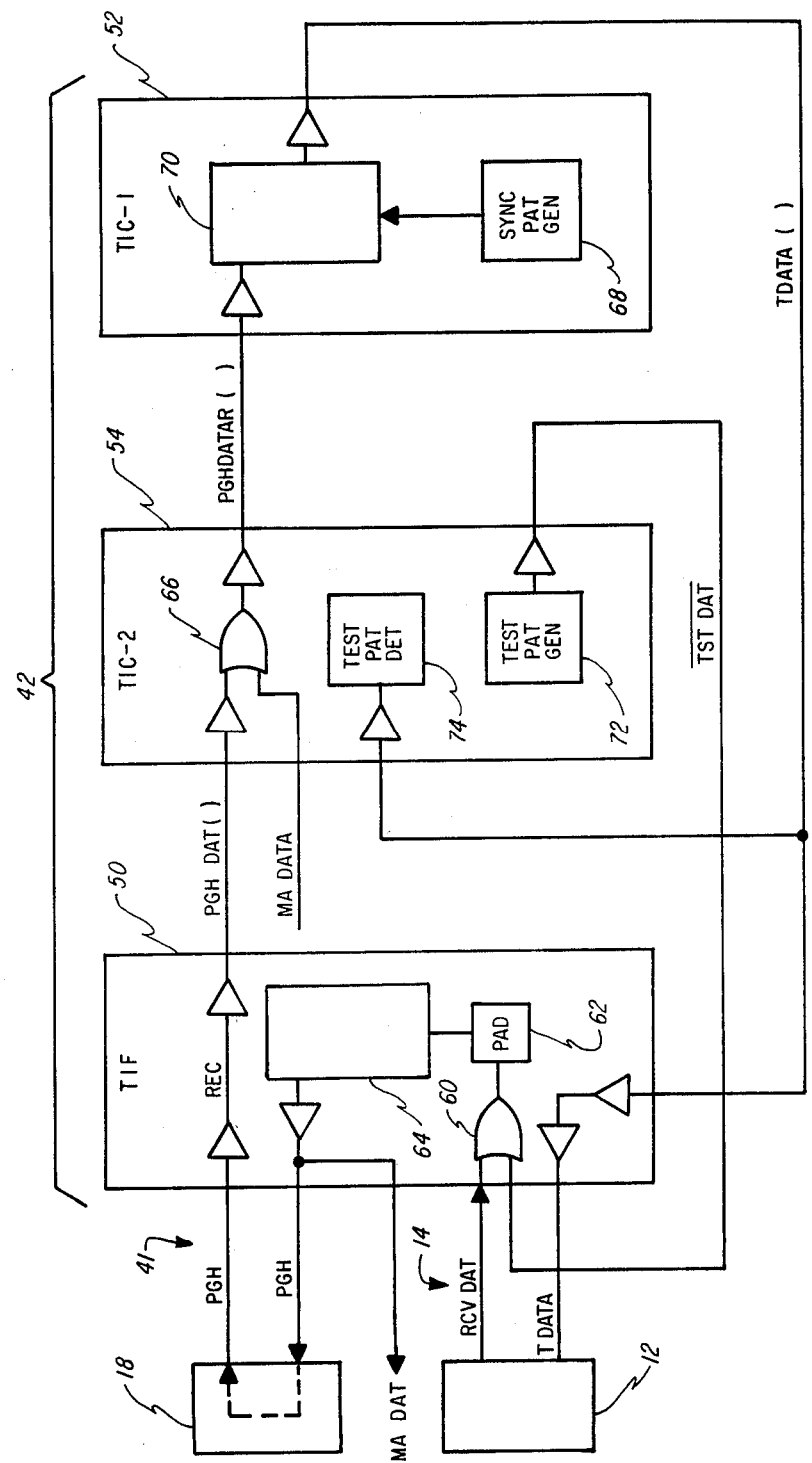
FIG. 2 is a diagram depicting the transfer of certain signals among various elements of the network depicted in FIG. 1.

FIG. 2 generally illustrates the transfer of voice and supervisory signals among the modules comprising interface 42. RCV DAT receive data signals received from highways 14 are coupled through a multiplexer network (generally indicated by the "OR" symbol having the reference numeral 60) and a pad network 62, to a transposing network 64 for transmission to switch 18 over a port group highway 41. The signals are also transmitted to the message assembler as MA DAT message assembler data signals. The message assembler may retrieve the appropriate supervisory signals intended for it from the signal stream. Voice and supervisory signals from switch 18 are received in interface module 50 over a port group highway 41 and are transmitted directly to control module 54 as PGH DAT signals. MA DATA message assembler data signals are interleaved by a network 66 and transmitted as PGH DATAR signals to control module 52. The format of these signals is modified in transposer module 70 to the format of the signals on the highways 14 and combined with a synchronization signal generated by generator 68. The resulting TDATA T-1 data signals are then coupled to interface module 50 for transmission over highways 14 to remote line switch 12.

In addition, the interface module 42 can generate test data signals for testing the operation of interface 42. The control module 54 includes a test pattern generator 72 which generates a TST DAT test data signal which is transmitted to multiplexer network 60, where it can be coupled to pad network 62 in place of the RCV DAT receive data signals from highway 14. The TST DAT test data signals are transferred through the interface 42 and switch 18 in a manner similar to the transfer of voice signals therethrough. The test data signals are retrieved by a test data detector 74 and analyzed. The detailed operation of the modules comprising interface 42 during a test will be described below.

C. Signal Formats

At this point it may be helpful to describe the formats of voice and supervisory signals transmitted over highways 14 and 41. A detailed description of the signals transmitted onto one specific embodiment of highway 14, specifically the T-1 span, is presented in FIG. 3 and the accompanying portions of the specification of the aforementioned U.S. Pat. No. 4,393,495. A detailed description of the format of signals transmitted onto a port group highway 41 is presented in FIGS. 3 and 4 and the accompanying portions of the specification of the aforementioned U.S. patent application Ser. No. 507,935. The aforementioned figures and portions of the specifications are incorporated herein by reference.

In brief, the signalling format over a T-1 span has a unit defined as a "superframe". Each superframe is divided into twelve "frames", each of which comprises 24 eight-bit (or timeslot) channels which carry digitized voice signals, followed by a timeslot which carries a synchronization signal. The sequence of synchronization signals within each superframe has a predetermined pattern. A superframe, and thus the frames, channels, and timeslots comprising the superframe can be identified by reference to the series of synchronization signals.

The T-1 span also provides for control and sense supervisory signals to be transmitted to and from the remote line switches 12. "A SUPY" supervisory information signals are transferred in the least significant timeslot of the voice channels in the sixth frame of each superframe, and "B SUPY" supervisory signals are transferred in the least signficant timeslots of the voice channels in twelfth frame of each superframe.

Figure 3:
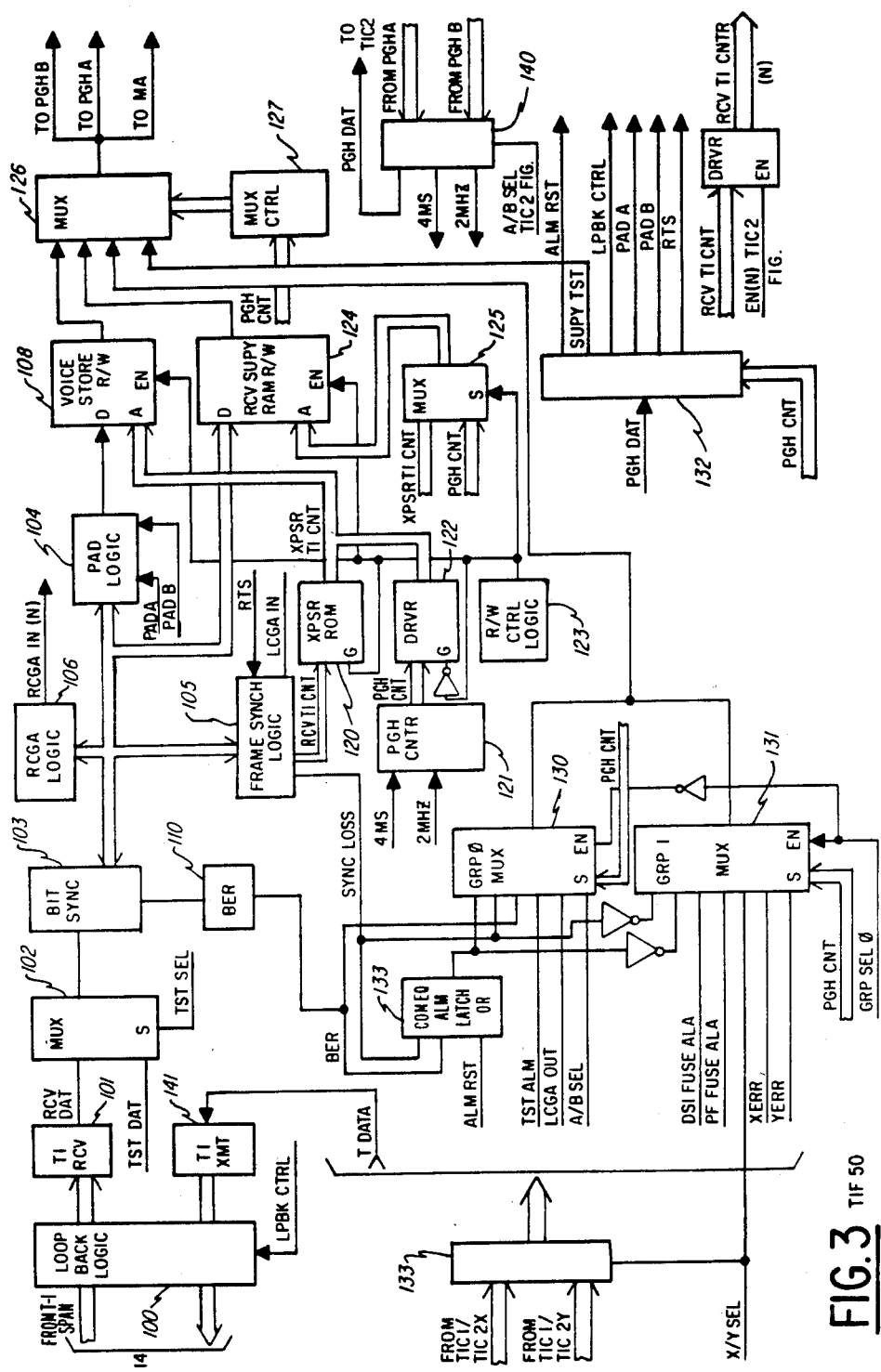
FIG. 3 is a detailed block diagram of an interface module useful in the telephony network depicted in FIG. 1.
Figure 4:
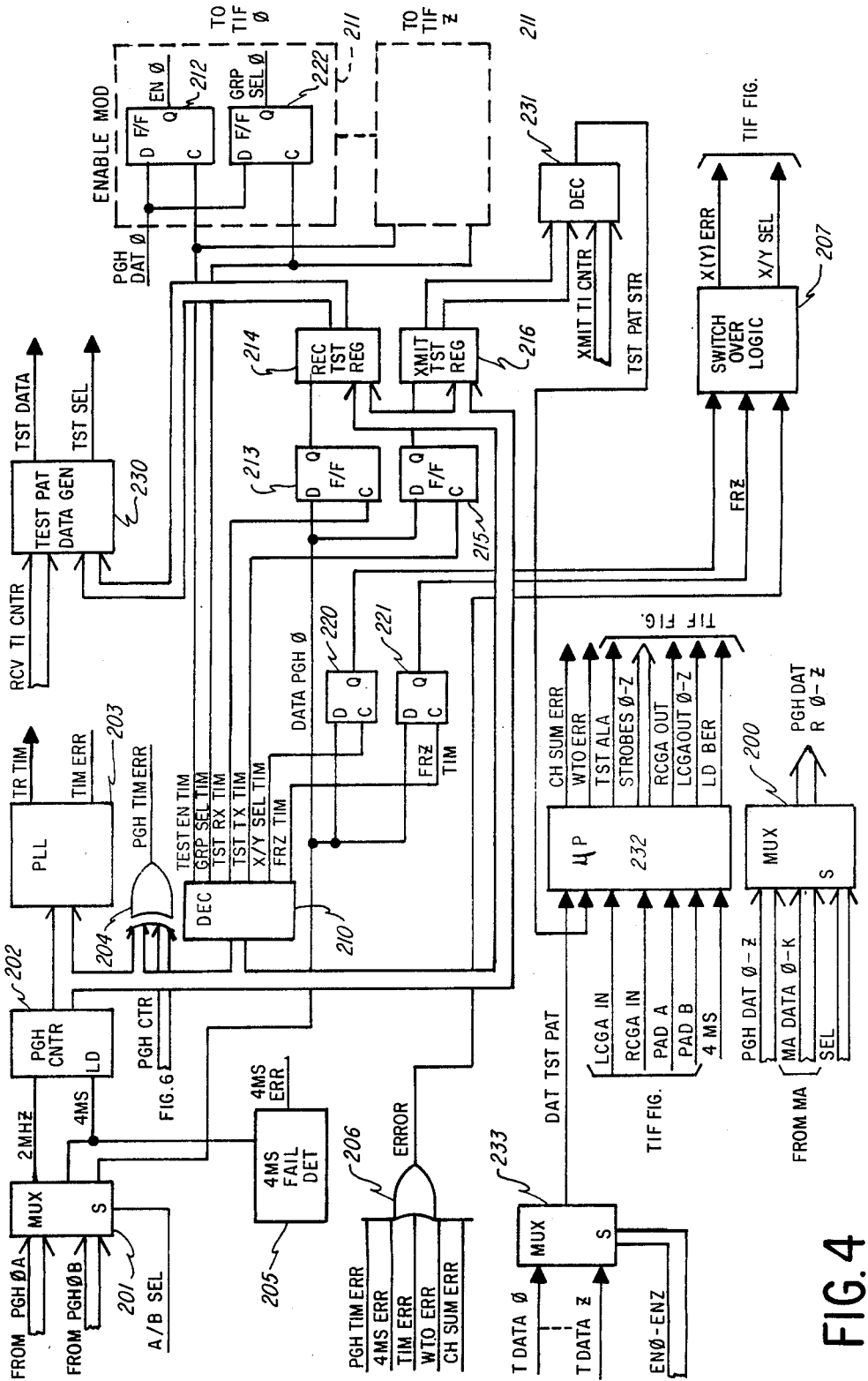
FIG. 4 is a detailed block diagram of one of the control modules depicted in FIG. 1 that is useful with the interface module depicted in FIG. 3.

The basic unit of the protocol over a port group highway 41 is a PGH frame of 32 timeslot channels. Thirty channels carry digitized voice signals, and the other two channels carry supervisory information. A group of sixty-four successive PGH frames forms a "fast bit" frame, and four successive fast bit frames forms a "slow bit" frame. This is illustrated in FIG. 3 of the aforementioned Patent Application Ser.No. 507,935. FIG. 4 of that application illustrates the allocation of the signals carried by channels 30 and 31 to the voice channels and to the control channels. Specifically, each PGH frame includes two timeslots which are allocated to the channels as illustrated in FIG. 4 of the application. Within each fast bit frame, two "fast SUPY" supervisory signals designated F0 and F1 and two of eight "slow SUPY" supervisory signals S0 through S7 are transferred for each channel. Within each slow bit frame, an entire complement of the eight slow supervisory signals S0 through S7 are transferred.

It should be noted that the T-1 span protocol accommodates twenty-four voice channels and the port group highway protocol will accommodate up to thirty voice channels. In one specific embodiment of the invention, the port group highways are limited to twenty-four voice channels, to match the number of voice channels available on the T-1 spans.

FIG. 7 herein illustrates the control and sense supervisory information transferred by each port group highway in one specific embodiment of the invention. The columns headed "Control Signals" indicate signals which are provided by call control processor 16 and interleaved by timeslot interchange 18 with the voice signals for transmission to interface 42. The columns headed "Sense Signals" identify signals that are transmitted by interface module 42 and interleaved with the voice data that is transmitted onto the respective port group highway to the timeslot interchange 18. The timeslot interchange strips the sense supervisory signals from the received signals, and transmits them to call control processor 16 for processing. The meanings of the signals depicted in FIG. 7 will be made clear by the discussion of FIGS. 3–6 and 8–14.

II. SPECIFIC DISCUSSION

A. Interface Module

FIG. 3 depicts a block diagram of an interface module 50 (FIG. 1). During normal operation, serial voice and supervisory information signals from a remote line switch 12 are multiplexed onto a highway 14 and are coupled through a loopback logic module 100 to a receiver 101. Receiver 101 changes the bipolar signals that are transmitted over highways 14 into unipolar signals, and transmits them as RCV DAT receive data signals to multiplexer 102. The multiplexer 102, which corresponds to multiplexer 60 (FIG. 2), also receives the TST DAT test data signals from control module 54. One of these input signals, as selected by the TST SEL (test select) signal also from module 54, is coupled to a bit synchronizer 103. The bit synchronizer synchronizes to the received signals and converts them to words in parallel form. In one specific embodiment, each word comprises eight bits, and represents, in digital form, the amplitude of a sampled analog voice signal.

The words from bit synchronizer 103 are coupled to pad logic 104, a frame synchronizer 105, and remote carrier group alarm logic 106. The frame synchronizing incoming signals from highway 14. The frame synchronizing logic 105 locates the synchronizing signal in the incoming signal stream and generates timing signals identifying the frame, channel and time slot for each word and bit transmitted by bit synchronizer 103.

Pad logic 104, which corresponds to pad network 62 (FIG. 2), determines the increase or decrease of volume of the voice signal. As has been mentioned, each eight-bit word corresponds to the amplitude of a sample of the analog voice signal. If it is necessary to increase or decrease the analog amplitude, or volume, of the voice signal, the pad logic adjusts the bits comprising the digital word accordingly. The amount of increase or decrease of the amplitude is determined by PAD A and PAD B signals that come from the call control processor 16 as control supervisory signals (see FIG. 7). Pad logic 104 also converts the padded signals to serial form for transmission to a voice store 108.

The remote carrier group alarm logic 106 (FIG. 3) generates an RCGA IN signal in response to a selected bit pattern from the highway 14. This is an alarm signal which indicates that the remote line switch 12 has lost synchronization with the signals which it receives from the highways 14 (FIG. 1).

Bit synchronization logic 103 also transmits a signal to a bit error rate (BER) circuit 110 (FIG. 3) which counts the number of errors in a selected number of received time slots, which, in turn, corresponds to a selected time scale. If the number of received errors exceeds a selected threshold minimum, bit error rate logic 110 generates a BER error signal which is used for maintenance and diagnostic purposes.

As has been mentioned, interface 50 transposes the bits from the pattern which it receives from a highway 14 to the pattern for transmission onto a port group highway 41. The transposing logic 64 (FIG. 2) includes the voice store 108, frame synchronization logic 105, a transposer ROM 120, a PGH counter 121, a gated driver 122, read/write control logic 123, supervisory RAM 124, multiplexers 125 and 126, and control logic 127.

The central element of transposer logic 64 is the voice store 108, which alternately loads the serial digital voice signals from pad logic 106 into selected storage locations, and transmits signals representing the contents selected locations in the format of highway 41. Supervisory RAM 124 performs the same operation on the A SUPY and B SUPY supervisory signals from highway 14.

Voice store 108 is addressed from two sources. The first address source relates to the sequence of time slots from which the signals are received from the highway 14. The second address source defines the sequence of time slot channels transmitted onto port group highway 41. The frame synchronization logic 105 generates a RCV T1 CNT (receive T-1 count) signal which identifies the time slot of the voice signal then being received at the Data inputs of the voice store. A transposer ROM 120 receives a RCV T1 CNT signal and generates an XPSR T1 CNT (transposer T-1 count) address for voice store 108 which, with read/write control logic 123, enables the voice signal from pad logic 104 to be loaded into the identified location of voice store 108.

The second address source for voice store 101 includes port group highway (PGH) counter 121, which receives 4 MS (4 millisecond) and 2 MHz (2 megahertz) timing signals from the port group highway 41. Counter 121 generates a PGH CNT count signal which identifies the port group highway time slot. The PGH CNT signal transmitted by PGH counter 121 constitutes the address of the location whose contents are transmitted by voice store 108 in response to a read enabling signal from read/write control logic 123.

It should be noted that both the RCV T1 CNT signal and the PGH CNT signal are sequentially incremented by the respective logic 105 and PGH counter 121. The transposer ROM 120 thus enables the transposition, through voice store 108, of the voice signals from the format of highway 14 to the format of highway 41. The transposer ROM 120 enables voice signals to be loaded into selected locations of the voice store so that, as sequential locations are read out, they are in the format suitable for transmission over highway 41.

The read/write control logic 123 determines which of transposer ROM 120 or PGH counter 121 addresses voice store 108 at any given time, and also enables the read/write enable input of voice store 108. The voice store 108, during each cycle, first receives a voice signal from pad logic 104 and writes, or stores, it in the addressed location. During the second portion of the cycle, the voice store reads the contents of a selected location and transmits a signal representative thereof to PGH data multiplexer 126.

In a similar manner, receive supervisory RAM 124 is enabled to store the A SUPY and B SUPY supervisory bits received from the highway 14 in the sixth and twelfth frames of each superframe. A multiplexer 125 couples one of the XPSR T1 CNT or PGH CNT signal to the address inputs of supervisory RAM 124, which is enabled to alternately write and read in the same manner as voice store 108.

The signal which is transmitted over the port group highway 41 is determined by the port group highway data multiplexer 126 under control of control circuit 127. Multiplexer 126 selects signals from either voice store 108, supervisory RAM 124, or one of multiplexers 130, 131 or 132. Multiplexers 130, 131 and 132 couple one of a number of sense supervisory signals (see FIG. 7) identifying various conditions in connection with the interface module 50, with the specific signal depending on the time slot being transmitted over highway 41. For example, multiplexer 130 couples one of the GP0 SENSE group 0 sense supervisory signals for PGH channel 30 (FIG. 7), which include: (a) the BER (bit error rate) signal from BER bit error rate logic 110, (b) a SYNC LOSS signal from frame synchronization logic 105, which indicates whether interface module 50 has lost synchronization with the received signal stream from highway 14 (c) the logical OR of the BER and SYNC LOSS signals, which is performed by an or gate circuit 133, (d) a TST ALM test alarm signal generated by control module 54 (FIG. 1) (e) an LCGA local carrier group alarm signal generated by control module 54, and (f) and A/B SEL selection signal which indicates the one of the redundant port group highways from which the interface module 50 is receiving signals. The particular supervisory signal which is transmitted by multiplexer 130 depends on the PGH CNT signal from counter 121.

Multiplexer 131 couples the GP1 SENSE group 1 sense supervisory signals for sense channel 30, which include the complements of the BER and SYNC LOSS signals, as well as DS1 FUSE ALA and PF FUSE ALA alarm signals which indicate the conditions of various power supplies powering the interface 42, an X/Y SEL selection signal which indicates which of the redundant set of control modules 52 and 54 is on-line, and X ERR and Y ERR error signals which indicate whether either of the redundant control modules has detected an error. The X/Y SEL signal also controls a multiplexer 133 which enables interface module 50 to receive signals from one of the redundant sets of control modules 52 and 54.

The voice and control supervisory information received by interface module 50 from call control processor 16 through switch 18 are received through a multiplexer 140. The multiplexer selects signals from one of the redundant port group highways denominated PGHA and PGHB, the selection being made by the A/B SEL signal provided by control module 54. In addition to the voice and control supervisory information, the selected port group highway also provides the 4 MS and 2 MHz timing signals. The received voice and supervisory information signals are transmitted to the control module 54 as PGH DAT signals, as is also illustrated in FIG. 2.

The PGH DAT signals are also decoded in a decoder 132 under control of the PGH CNT signals from PGH counter 121 (FIG. 3). The decoder identifies which of the PGH DAT signals are control supervisory signals used by the interface module and extracts them from the signal stream. The control supervisory signals extracted by decoder 132 include (see FIG. 7) an ALM RST alarm reset signal, which clears a latch in circuit 133, a SUPY TST supervisory test signal which is coupled to multiplexer 126 and operates as a loopback test signal in the supervisory information path, an LPBK CTRL loopback control signal which controls loopback logic 100 for a loopback test, the PAD A and PAD B signals which control pad logic 104, and an RTS return to search signal which enables frame synchronization logic 105 to search for the synchronization pattern of the signals received from highway 14.

The TDATA signals are received from the selected one of the redundant X or Y control modules 52 through multiplexer 133, and are coupled to a transmitter 141. Transmitter 141 changes the signal from unipolar to bipolar form for transmission through loopback logic 100 and onto highway 14 to remote line switch 12.

B. Control Module 54

FIG. 4 contains a block diagram of a control module 54. This control module (a) interleaves the PGH DAT signals with the MA DAT signals from message assembler 56, (b) performs diagnostic operations, including a data test, on a selected interface module in selected transmit and receive time slot channels on the highway 41 to which the interface module is connected, and (c) determines which of the redundant X and Y set of control modules 52 and 54 is on-line controlling the interface 42.

As has been mentioned, the PGH DAT signal from an interface module 50 is coupled to the control module 54, where it is interleaved with MA DATA communication signals from the message assembler 56. This operation is performed in a multiplexer 200 (FIG. 4). As is shown on FIG. 1, a control module 54 may control a number of interface modules 50. The message assembler may generate message signals for transmission through a number of the interface modules. The multiplexer 200 thus couples the PGH DAT signals for the interface modules 50 which do not receive MA DATA signals directly therethrough. However, for the interface modules which do transfer message assembler communication signals, the corresponding PGH DAT signals are interleaved with MA DATA signals so that the message assembler message signals are transmitted in selected channels. The resulting PGH DATAR output signals from multiplexer 200 are then coupled to control module 52 (FIG. 1).

In performing its diagnostic and control function, control module 54 receives data and timing signals from one of the port group highways 41, which is designated PGH 0. The 4 MS and 2 MHz timing signals from the selected one of the redundant PGH 0A or PGH 0B, which will generally be identified as PGH 0, is coupled through a multiplexer 201 to a port group highway counter 202. The PGH counter 202 identifies the time slot channels on the PGH0 port group highway. The output of the PGH counter 202 is coupled to a phase lock loop timing circuit 203, which generates a TR TIM transmit time signal which is coupled to the control module 52 (FIG. 6), and which governs the timing of the signals transmitted onto highways 14, and a TIM ERR error signal which indicates the status of the phase lock loop 203.

As explained below in connection with FIG. 6, the control module 52 also includes a PGH counter, which generates a PGH CTR signal. The output signal from the PGH counter 202 and the PGH CTR signal from control module 52 are compared by a comparison circuit 204 and a PGH TIM ERR error signal is generated if there is a difference between the two signals.

In addition, the control module 54 includes a detector 205 which receives the 4 MS timing signal from multiplexer 201. If the 4 MS timing signal fails to appear at the proper time, detector 205 generates a 4 MS ERR error signal.

The TIM ERR, PGH TIM ERR, and 4 MS ERR signals along with two other error signals, namely a WTO ERR watchdog time-out error signal and a CH SUM ERR check sum error signal, which are explained below, are coupled to an OR gate 206. If any of these error signals are asserted, OR gate 206 is enabled to generate an ERROR error signal which is coupled to switch-over logic 207. This logic 207 controls the X/Y SEL selection signal which selects which of the redundant X and Y sets of control modules 52 and 54 control the interface 42. Switch over logic 207 also generates the XERR or YERR signal, depending on which set of control modules include the circuits, which is coupled to multiplexer 131 (FIG. 3) for transmission over port group highway 41.

As has been mentioned, the port group highway counter 202 identifies the time slot being received from the port group highways 41. A decoder 210 receives the output signals from PGH counter 202 and identifies the time slot channels in which certain supervisory information is being received from PGH 0. Specifically, if the PGH counter 202 identifies the time slot channel as carrying a data test enable signal, decoder 210 generates a TEST EN TIM test enable time signal. In that time slot channel, if one of the interface modules 50A through 50Z is to engage in a data test, its highway 41 will carry an asserted TEST EN test enable control supervisory signal (FIG. 7). Control module 54 includes an enable module 211 for each interface module 50 which includes a flip-flop 212. The flip-flop 212 receives the PGH DAT signal from the associated interface module. All of the flip-flops 212 in the enable modules 211 receive the TEST EN TIM signal in tandem. Thus, if the PGH DAT signal for an interface module is asserted at the "test enable" time, the flip-flop 212 for that interface module will be set to assert an EN (n) signal, which enables the identified "nth" interface module 50 to engage in the data test.

The time slot channel over which the data test is to take place is identified by control bits which are associated with the selected channel. The channel identification is transmitted over PGH 0 of highways 41. When the receive test channel identification is to be present on PGH 0, decoder 210 asserts a TST RX TIM signal (FIG. 7) which enables the clock input of a flip-flop 213. If the signal which then comprises TST RX receive test control supervisory signal (FIG. 7), on PGH 0 is asserted at that time, the flip-flop 213 sets, which enables a register 214 to store the signals from PGH counter 202, thereby identifying the channel to engage in the receive portion of the data test. Similarly when the PGH0 is to carry a designation of the channel to carry the transmit portion of the data test, the flip-flop 215 is set by an asserted TST TX control supervisory signal on PGH 0 (FIG. 7) and a TST TX TIM clocking signal from decoder 210. This enables a transmit test register 216 to store the signals from PGH counter 202 which identifies the channel to engage in the transmit portion of the data test.

Highway PGH 0 also carries the X/Y SEL control signal which selects which of the redundant control modules 52 and 54 are on-line, and an FRZ freeze signal which prevents switch over logic 207 from enabling switch-over to the other redundant set of control modules. In the proper timeslot channel, decoder 210 generates an X/Y SEL TIM signal which clocks a flip-flop 220. If the X/Y SEL control supervisory signal is asserted at that time, the switch over logic 207 is enabled to assert or negate its X/Y SEL signal. In the time slot channel for the FRZ control supervisory signal, the decoder 210 generates the FRZ TIM freeze time signal which clocks flip-flop 221. If the DAT PGH 0 signal on PGH 0 is then asserted, flip-flop 221 generates the FRZ signal, which is coupled to switch over logic 207.

As has been mentioned, channel 30 of the signals transmitted over highways 41 to switch 18 can carry two sets of sense information, one set being provided by each of the multiplexers 130 or 131 (FIG. 3). The signal group which is selected is controlled by a SENSE GP 0/1 control supervisory signal in channel 30 from switch 18. This control supervisory signal is transmitted over each of the highways PGH 0 through PGH Z. At the time that this signal is transmitted, the decoder 210 generates a GRP SEL TIM group select time signal, which is transmitted to all of the enable modules 211, and specifically to a flip-flop 222 present in all of the enable modules. The condition of the PGH DAT signal received by the respective modules 211 at that time governs whether a flip-flop 222 will be set or reset, which enables one of multiplexers 130 or 131 in each interface module. As is apparent, the flip-flops 222 are individually set or reset in each of the enable modules.

The data test data signals are generated by a test pattern generator 230. When the appropriate channel is being received, as indicated by the correspondence between the RCV T1 CNTR receive T1 counter signals from the enabled interface module 50 and the contents of the receive test register 214, test pattern generator 230 generates a test data word, which is serialized and transmitted as TST DATA signals to multiplexer 102 in interface module 50 (FIG. 3). The enabled interface module couples the data test data signal through the multiplexer 102 instead of the RCV DAT signal.

Similarly, when the XMT T1 CNTR transmit T1 counter signal generated by control module 52 corresponds to the contents of the transmit test register, a decoder 231 generates a TST DAT STR data test strobe signal, which is coupled to the microprocessor system 232. This identifies when the data test data is available for reception by the microprocessor, which includes test pattern detector 74 (FIG. 2). The TDATA (n) signals for the enabled interface module are coupled through a multiplexer 233 to microprocessor system 232 as DAT TST PAT received data test pattern signals.

Figure 5:
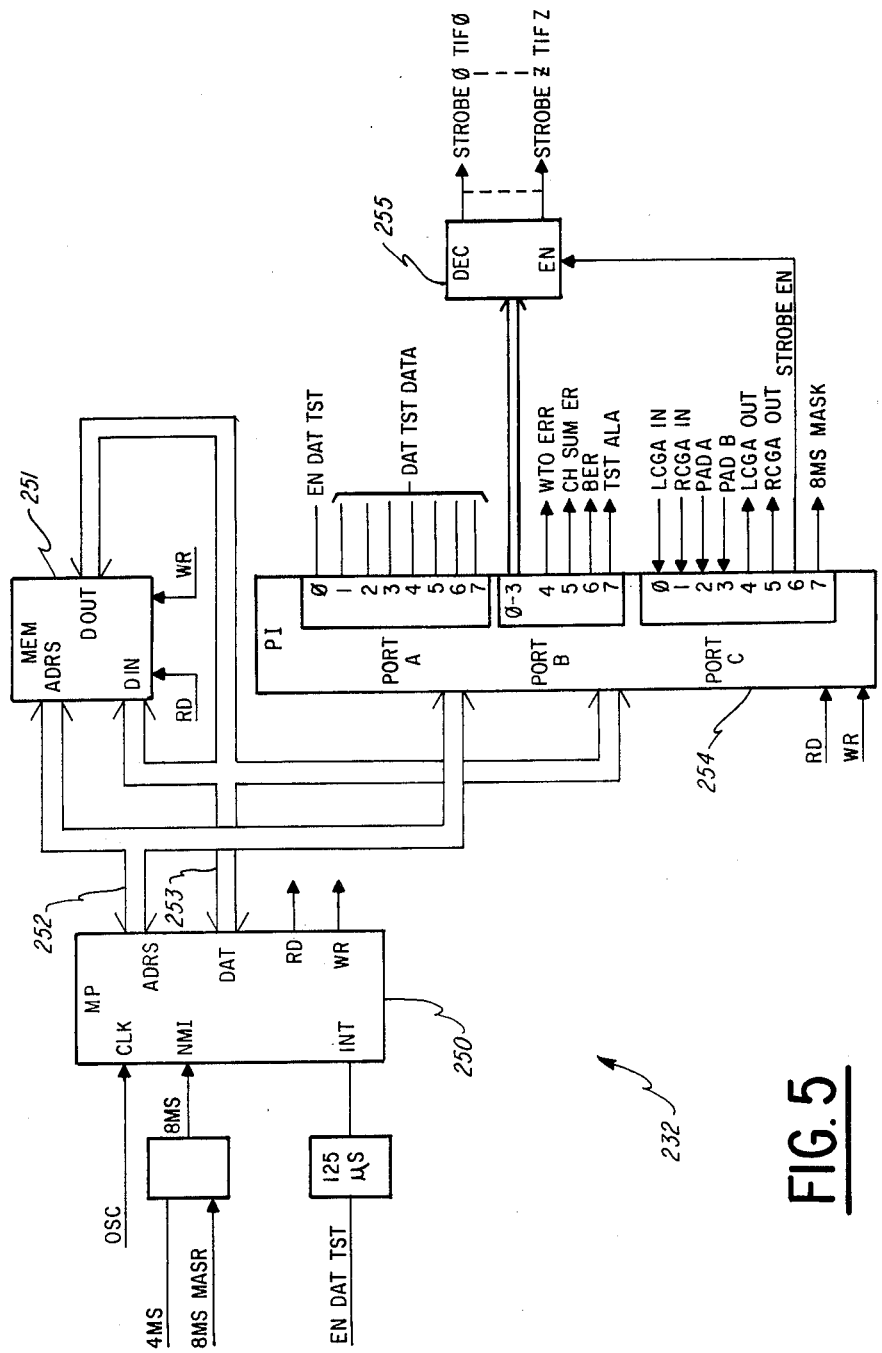
FIG. 5 is a block diagram of a microprocessor module that is useful in the control module depicted in FIG. 4.

A detailed block diagram of the microprocessor system 232 is presented in FIG. 5. The microprocessor system includes a conventional microprocessor 250 which is connected to a memory 251 over address lines 252 and data lines 253. In one specific embodiment, memory 251 is divided into a program memory, which comprises a fixed storage, and a data memory. Data may be written into the data portion of memory 251, and read and write signals RD and WR are coupled to memory 251 for that purpose. The microprocessor 250 is also connected to a peripheral interface 254, through which it receives and transmits signals with the rest of interface 42.

The peripheral interface 254 includes three ports designated ports A, B and C. The microprocessor 250 transmits an EN DAT TST signal which enables a data test to occur, and receives in parallel DAT TST DATA data test data, through port A. A serial to parallel converter (not shown) receives the serial DAT TST PAT data test pattern signals from multiplexer 233 (FIG. 4) and generates a parallel DAT TST DATA data test data word.

Microprocessor 250 uses port B of peripheral interface 254 to transmit binary-encoded strobe signals to a decoder 255 which enable one of the interface modules 50A through 50Z to perform a remote and local carrier group alarm test. These tests are described below in connection with FIGS. 11A-1, 11A-2 and 11B.

In addition, port B is used to transmit the WTO ERR watchdog timeout error, CH SUM ERR checksum error, BER bit error rate, and TST ALA test alarm signals.

Port C of peripheral interface 254 is used by the microprocessor 250 to receive the LCGA IN and RCGA IN signals from remote carrier group alarm logic 106 and frame synchronization logic 105 (FIG. 3), from the interface module identified by the STROBE 0-STROBE Z signals, for use in the respective LCGA and RCGA tests. Microprocessor 250 also receives the PAD A and PAD B signals through Port C for use in the data test, which allows microprocessor 250 to accommodate possible padding of the data test signals by the selected interface module.

The microprocessor 250 also transmits through port C of peripheral interface 254, the LCGA OUT and RCGA OUT signals which are, in turn, transmitted as sense supervisory signals through multiplexer 130 (FIG. 3). A STROBE EN signal transmitted through port C enables decoder 255 to transmit the strobe 0 through strobe Z signals. Finally, an 8 MS MASK signal causes a mask to be established for one of the interrupt modes of microprocessor 250 for use during initialization.

The microprocessor 250 is clocked by a conventional oscillator (not shown). The microprocessor operates in response to two types of interrupts, a non-maskable interrupt which occurs every eight milliseconds, in response to the 4 MS timing signal, and a maskable interrupt which the microprocessor uses to receive the data test data signals.

C. Control Module 52

With reference to FIG. 2, the control module 52 receives the PGH DATAR signals, which are the voice and control supervisory signals interleaved with the MA DAT signals from the message assemblers. These signals are in the format of signals carried by highways 41. The control module 52 converts the formats of these signals into the formats of the highways 14, inserts the synchronization pattern signals and transmits the resulting signals to the interface modules 50A through 50Z.

Figure 6:
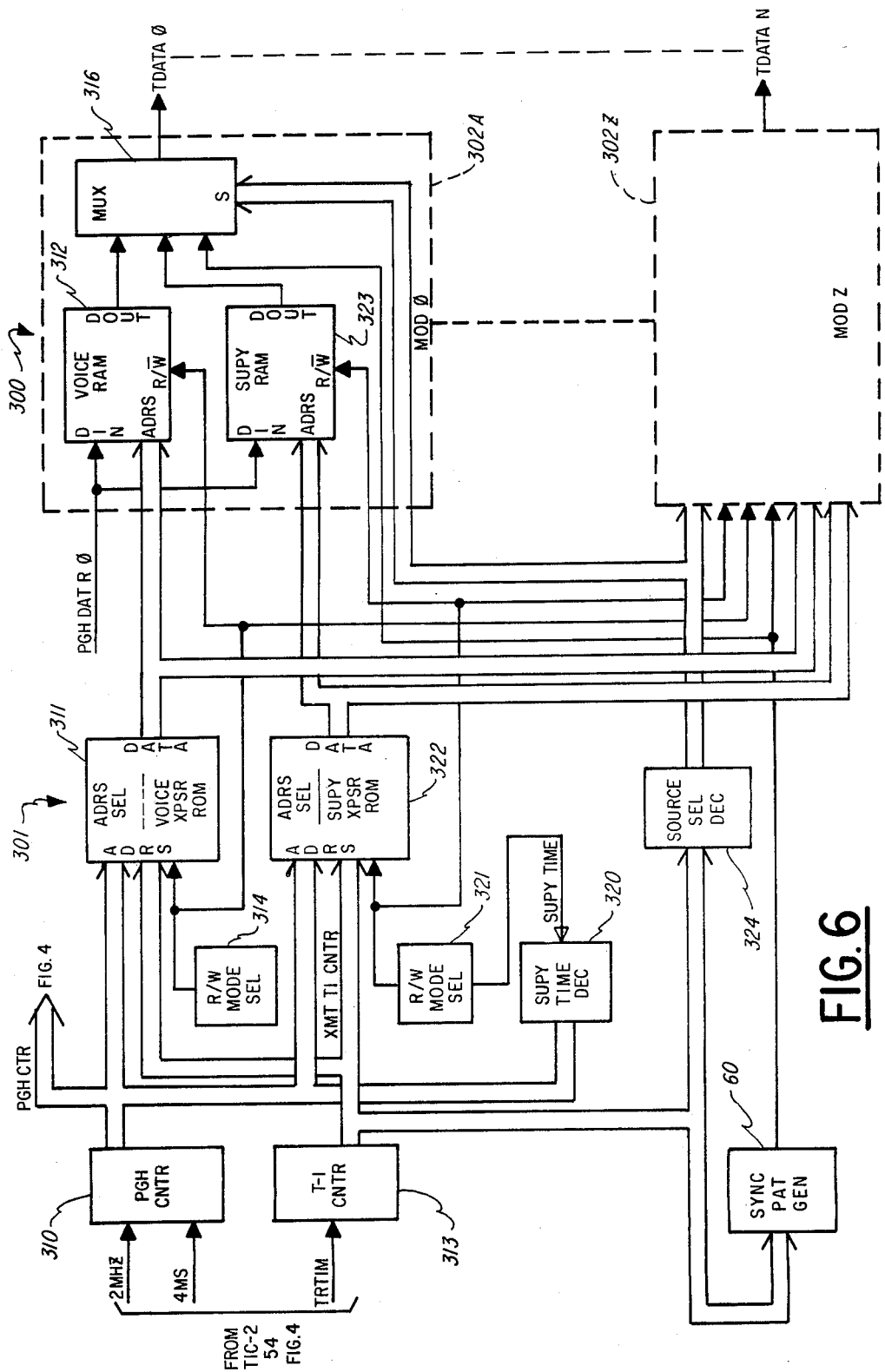
FIG. 6 is a detailed block diagram of the other control module depicted in FIG. 1 that is useful in connection with the interface module depicted in FIG. 3 and the control module depicted in FIG. 4.

FIG. 6 contains a detailed block diagram of the control module 52. A control module depicted in FIG. 6 includes two portions, a transposer portion 300 and an address portion 301. The transposer portion 300 includes modules 302a through 302z each of which receives the PGH DATAR signal for the associated interface module from the control module 54 and transmits TDATA signals, which are coupled to the associated interface module. The control portion 301 controls the transposition between the formats of the highways 41 and the highways 14, in a manner similar to the transposition operation performed by interface module 50 (FIG. 3). A PGH counter 310 identifies, based on the 2 MHz and 4 MS timing signals from multiplexer 201 (FIG. 4) the timeslot channel then being received from highways 41. A transposer ROM 311 identifies an address in a voice RAM 312 in transposition logic 300, into which the PGH DATAR bit is then written. Similarly, a T1 counter 313 identifies the timeslot then being transmitted over the highway 14, based on the TR TIM timing signal from phase lock loop 203 (FIG. 4). If the timeslot is a voice timeslot, the resulting XMT T1 CNTR signal enables transposer ROM 311 to transmit an address to voice RAM 312. Voice RAM 312 in turn, under control of read/write mode select logic 314, transmits the contents of the addressed location to multiplexer 316.

When the PGH CNTR signals from PGH counter 310 identify a timeslot which is to contain an A SUPY or B SUPY control supervisory signal, a decoder 320 transmits a SUPY TIME signal which enables the read/write mode select logic 321 to, in turn, enable a transposer ROM 322 to generate an address. The address transmitted by transposer ROM 322 identifies a location in supervisory RAM 323 into which the PGH DATAR signal is loaded. When the XMT T1 CNTR signals from T1 counter 313 identify the timeslots into which the A SUPY and B SUPY control supervisory signals are to be inserted, the transposer ROM 322 generates the signals of the corresponding addresses in supervisory RAM 323. The contents of the addressed locations are then transmitted to multiplexer 316.

The last source of signals transmitted to multiplexer 316 is the synchronizing pattern generator 60 (see also FIG. 2), which generates a synchronization signal. The assertion or negation condition of the synchronization signal depends on the frame in the superframe then being transmitted on highway 14.

The multiplexer 316 is controlled by a decoder 324 which couples signals from one of the three input terminals as TDATA signals depending on the T1 timeslot identified by T1 counter 313.

It should be noted that control module 52 uses one set of transposition control logic 301 to control transposition and transmit timing for all of modules 302A through 302Z. This use of common transposition control logic significantly reduces the amount of circuitry in interface 42.

D. Operations Performed By Microprocessor Unit 232

The operations performed by microprocessor unit 232 are detailed in FIGS. 8 through 14. The detailed steps of these operations are illustrated in the respective figures, and will not be described herein. However, a brief description of the operations will be presented.

Figure 8:
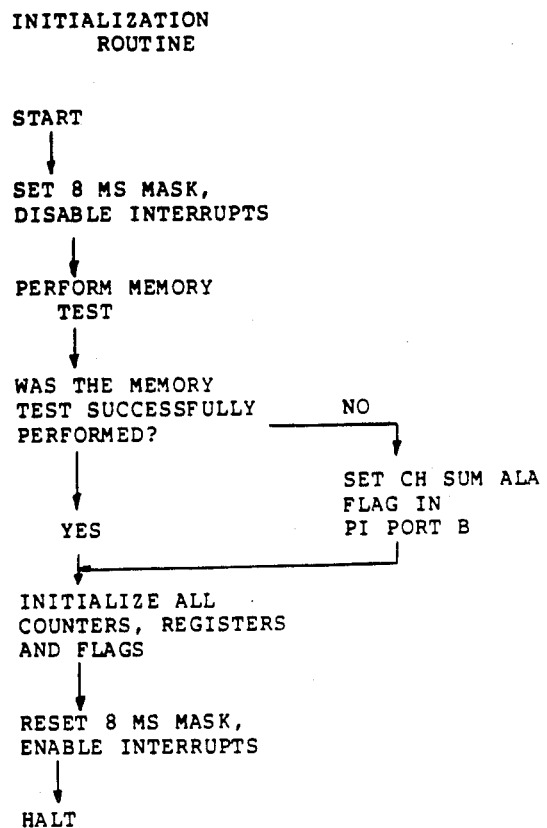

FIG. 8 contains an initialization routine. The microprocessor 250 (FIG. 5) performs a test of the data portion of memory 251. If the memory test fails, the CH SUM ALA check sum alarm flag is set in port B of peripheral interface 254. After the memory test, all counters, registers and flags are initialized by microprocessor 250.

Figure 9:
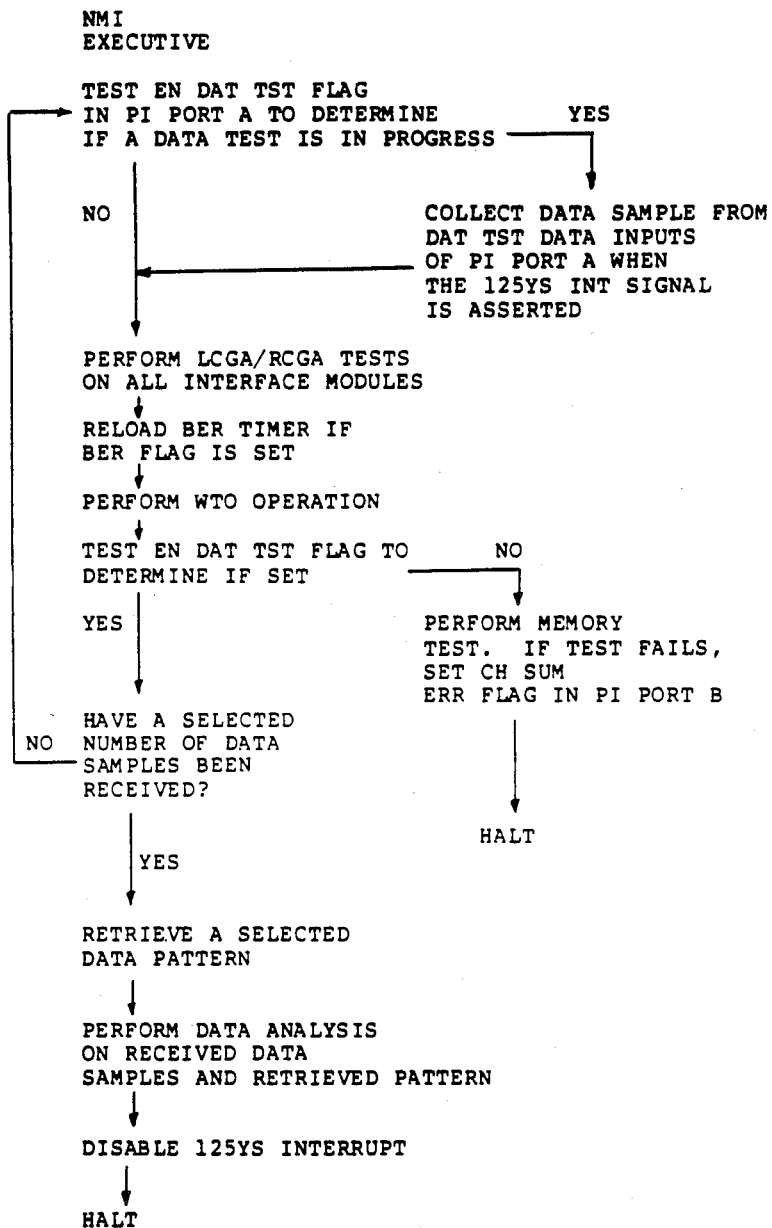

FIG. 9 illustrates the executive routine which is performed by microprocessor 250 in response to a non-maskable interrupt (NMI) which occurs every eight milliseconds. In the executive routine, the microprocessor collects data samples for a data test, if one is occurring, and performs LCGA and RCGA carrier group alarm tests. The microprocessor also reloads a bit error rate timer in bit error rate logic 110 (FIG. 3) if it has timed out. The microprocessor then performs a watchdog timeout operation. If no data test is in operation, the microprocessor performs a memory test. If a data test is occurring and if a predetermined number of data samples have been received, the microprocessor will begin performing an analysis on the received data to determine if it matches a selected pattern. If the required number of data samples has not been received, the microprocessor returns to the beginning of the executive program to collect another data sample. This process continues until another NMI non-maskable interrupt is received, at which time the microprocessor returns to the beginning of the routine depicted in FIG. 9.

Figure 10:
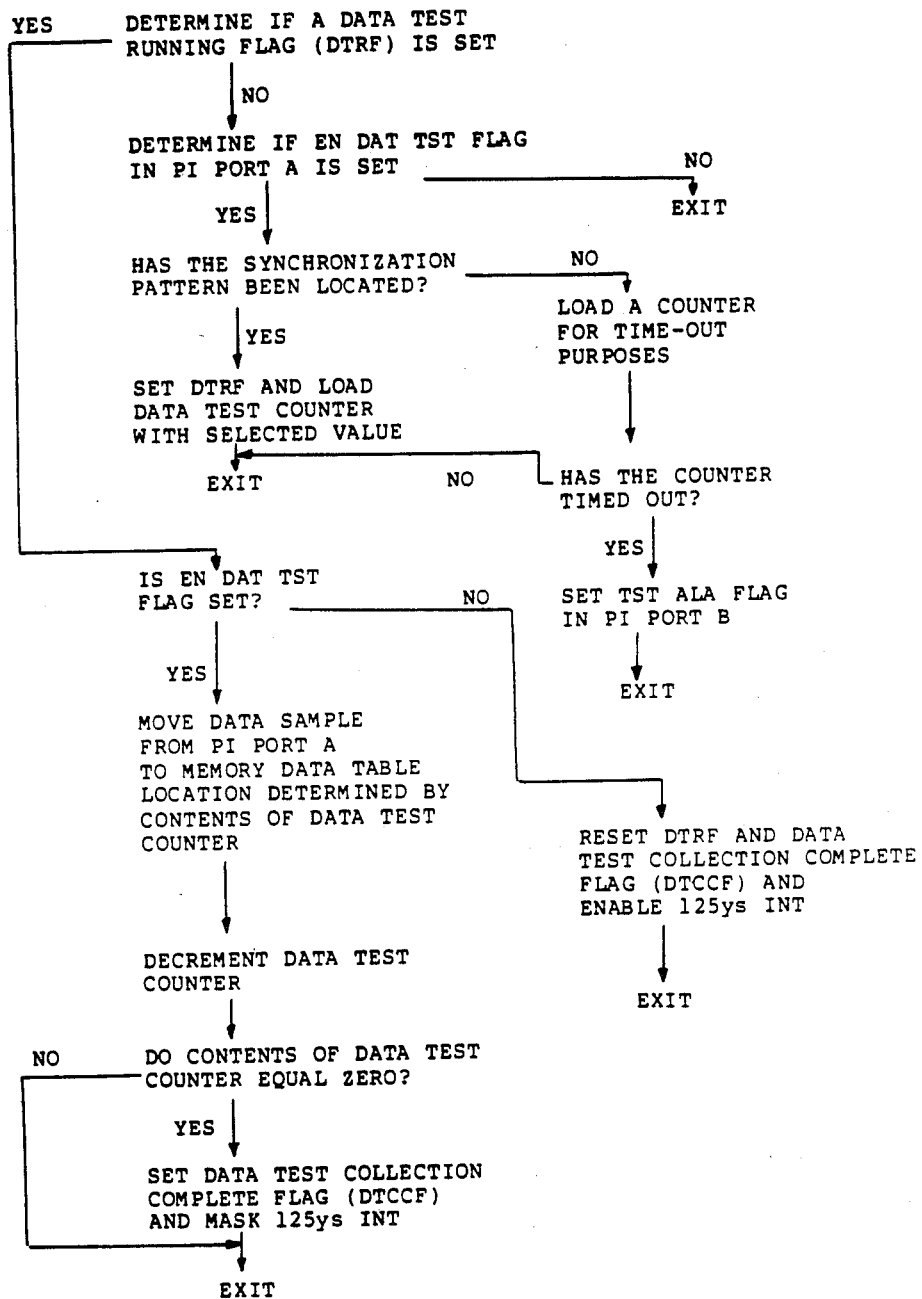

FIG. 10 illustrates the procedure used by microprocessor 250 during a data test to collect a data sample. In the data test, a predetermined number of data samples are generated, each having a selected bit pattern. The data samples are transmitted along the path described above with respect to FIG. 2, and received by the microprocessor for analysis. A counter is used to determine when the required number of data samples has been collected.

Figures 2, 11A:
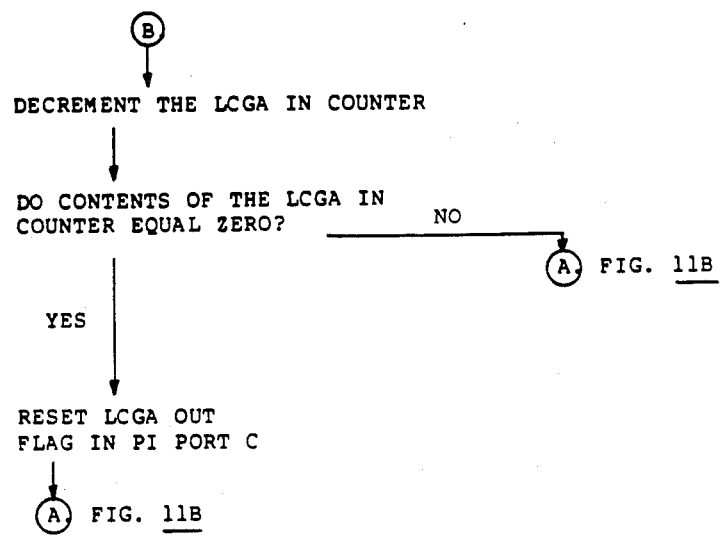

FIGS. 11A-1, 11A-2 and 11B contain a detailed description of the carrier group alarm test with FIGS. 11A-1 and 11A-2 primarily detailing the local carrier group alarm test and FIG. 11B primarily detailing the remote carrier group alarm test. The microprocessor 250 iteratively performs a carrier group alarm test on each of the attached interface modules 50A through 50Z, in sequence. In brief, the local carrier group alarm test is used to identify when an interface module 50 at the central office 10 has lost synchronization with the incoming signals on the highway 14 to which it is connected. If an interface module loses synchronization, its frame synchronization logic 105 (FIG. 3) asserts an LCGA IN signal. If the LCGA IN signal is asserted for a selected period of time, the microprocessor 250 sets an LCGA IN flag. If this flag remains set for a selected period of time, an LCGA OUT signal is asserted, which is transmitted to call control processor 16 (FIG. 1) as a CGA ALM carrier group alarm sense supervisory signal in group 0 of sense bits channel 30 (FIG. 7). If the interface module achieves synchronization after the LCGA IN flag is set, it must maintain synchronization for a selected period of time before the flag is reset and the CGA ALM signal is negated.

Similarly, the remote carrier group alarm indicates when a remote line switch 12 loses synchronization, which is indicated by the remote line switch repetitively transmitting a selected signal pattern over highway 14. When RCGA logic 106 in the attached interface module detects the repetitive pattern, it asserts an RCGA IN signal. If that signal remains asserted for a selected period of time, the microprocessor sets the RCGA OUT signal flag in port C of peripheral interface 254, which is also coupled to call control processor 16 as a CGA ALM carrier group alarm sense supervisory signal. If the RCGA IN signal is subsequently negated, the microprocessor maintains the RCGA OUT flag in a set condition until after the RCGA IN signal has been negated for a selected period of time.

FIG. 12 depicts the routine used by microprocessor 250 to reload the bit error rate counters in interface modules 50a through 50z, and to perform a watchdog timeout (WTO) routine. In the watchdog time out operation, the microprocessor alternately sets the WTO ERR flag in port B of peripheral interface 254, and a selected interval later resets it. If the microprocessor is not operating properly, the WTO ERR flag remains set, which signals an error to the call control processor.

Figure 13B:
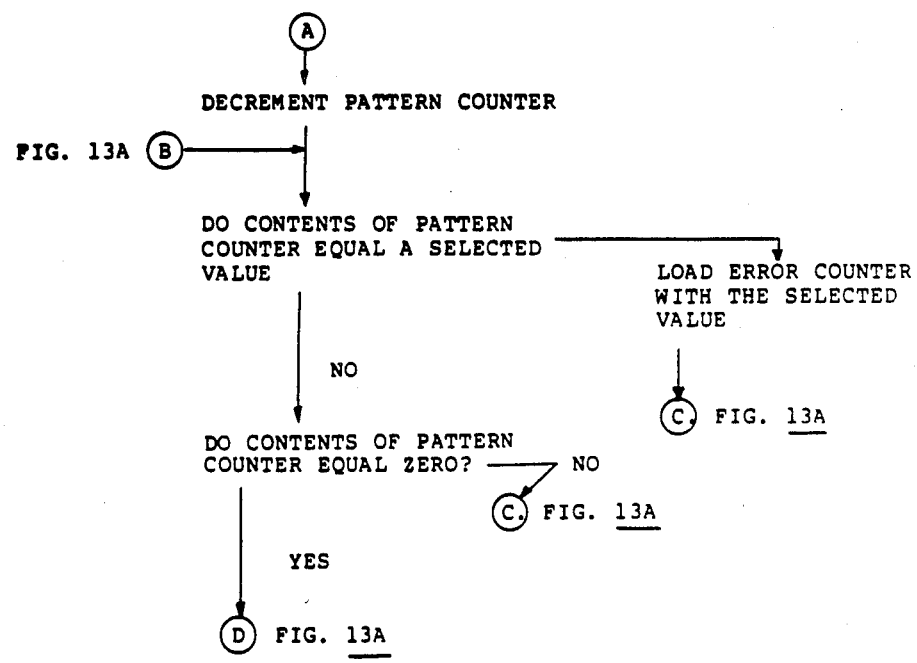

FIGS. 13A and 13B illustrate the procedure used by microprocessor 250 to analyze the data received in the data test. If a data test is not being performed, a program memory test is performed which is discussed below in connection with FIG. 14. In the data test analysis, the microprocessor compares each received data test data sample with a predetermined pattern. If more than a selected number of errors occur, a TST ALA test alarm flag is set and a corresponding signal is transmitted to multiplexer 130 (FIG. 3).

Figure 14:
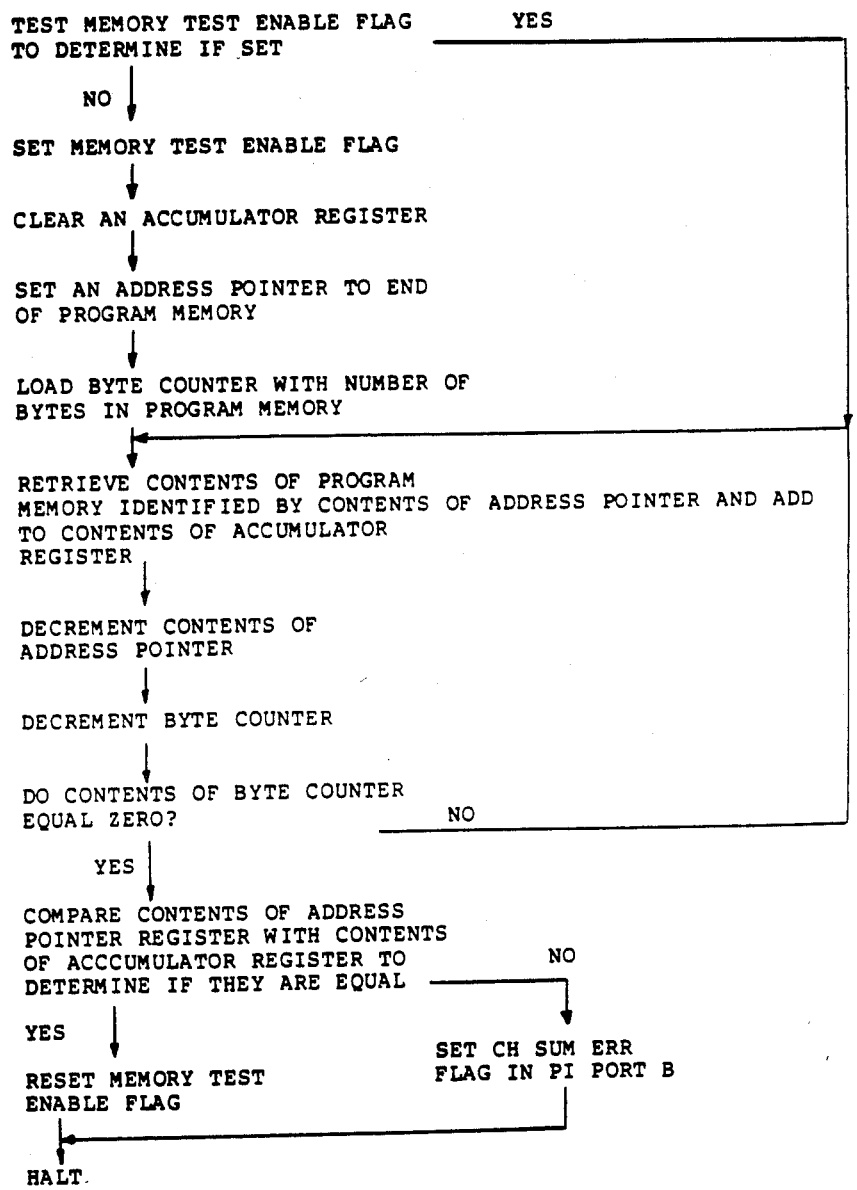

In the program memory test, which is presented in FIG. 14, the microprocessor sequentially retrieves the contents of each location in the program portion of memory 251, treats the contents as having a numerical value, and arithmetically adds the contents together. If the sum does not equal a selected value, the CH SUM ERR check sum error flag in peripheral interface 254 is set.

The foregoing description has been limited to a specific embodiment of this invention. It will be apparent, however, that the invention can be practiced in telephony networks having diverse basic construction than is disclosed in this specification with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A telephony network comprising a plurality of subscriber lines each connected to one of a plurality of remote concentrator means which is in turn connected for transferring digital voice signals to a central office over a plurality of communications links in a first digital signal format, the central office including a plurality of highways for transferring highway timing signals and digital voice signals in a second digital signal format, and an interface unit for coupling the digital voice signals between the communications links and the highways, the interface unit comprising a plurality of interface modules and a control module for controlling all of the interface modules in tandem, in which:

A. each interface module is connected to one communications link and one highway and includes:
   (i) communications link receiving means for receiving the digital voice signals in said first digital signal format from the communications link to which the interface module is connected, said receiving means including receiving timing means for generating communications link timing signals in response to the received digital voice signals for controlling the reception of the digital voice signals from said communications link;
   (ii) transposing means connećted to said communications link receiving means and the highway to which the interface module is connected for transposing the received digital voice signals from the first digital signal format to the second digital signal format in response to the communications link timing signals from the highway;
   (iii) highway transmitting means connected to said transposing means for transmitting digital voice signals from said transposing means over the highway to which the interface module is connected;

(iv) highway receiving means connected to said control module and to the highway to which the interface module is connected for receiving highway timing signals and voice signals in the second digital signal format and for transmitting them to the control module; and (v) communications link transmitting means connected to said control module and to the communications link to which the interface module is connected for receiving digital voice signals in the first digital signal format from said control module and for transmitting them over the communications link;

B. said control module including:

(i) control module receiving means connected to said highway receiving means of all of said interface modules and to one of said highways for receiving said digital voice signals in said second digital signal format from all of said interface modules and said highway timing signals from said one highway;

(ii) control module transposing means connected to said control module receiving means and all of said communications link transmitting means for transposing the digital voice signals from said second to said first digital signal format in response to the highway timing signals and for transmitting the transposed digital voice signals to respective ones of said communications link transmitting means for transmission over said communications link.

2. A telephony network as defined in claim 1 further comprising means for generating digital control and status message signals, said control module receiving means further comprising means connected to said message signal generating means for receiving said message signals and for interleaving the message signals with digital voice signals from selected ones of said interface modules to form a composite digital signal for transfer to said control module transposing means.

3. A telephony network as defined in claim 1 wherein each said transposer module in said control module includes a memory including a plurality of addressable storage locations for storing voice signals from the interface module in selected locations and for transmitting the contents of selected locations to the associated interface module.

4. A telephony network as defined in claim 3 wherein said highways transmit timing signals for synchronizing the transfer of voice signals thereover, said control portion in said control module including means for receiving the timing signals and for generating signals representative of the second signal format, and for generating timing signals for synchronizing the transfer of voice signals over said communications link and for generating signals representative of the first signal format.

5. A telephony network as defined in claim 4 wherein said control portion further includes means for enabling the memories in all of said transposer modules to store and to transmit voice signals in tandem, the storage locations into which said voice signals are stored being selected by said signals representative of the first signal format and the storage locations from which said voice signals are transmitted being selected by said signals representative of said first signal format.

6. A telephony network as defined in claim 5 wherein said highways and said communications links both transmit supervisory signals representative of supervisory information interleaved with said voice signals, (a) each of said interface modules transmitting said supervisory signals from the highway to which it is connected to said control module, (b) said transposer modules further including a supervisory signal memory that includes a plurality of addressable storage locations for storing supervisory signals from the interface module in selected locations and for transmitting the contents of selected locations to the associated interface module, (c) said control portion of said control module further including means responsive to said timing signals and said enabling means for generating control signals for enabling said supervisory signal memory to alternately store and transmit supervisory signals to accomplish a transposition between the second signal format and the first signal format.

7. A telephony network as defined in claim 6 wherein said control portion further includes means responsive to the signals representative of said first signal format for generating a source signal which identifies one of said voice signal memory or said supervisory signal memory, each transposer module further including selection means responsive to said source signal for transmitting the signal transmitted by the identified memory to the associated interface module.

8. A telephony network as defined in claim 7 wherein said control portion further includes means responsive to the signals representative of said first signal format for generating a synchronizing signal for transmission over all of said communications links, said synchronizing signal being coupled to all of said selection means in said transposer modules, said source means source signal further identifying said synchronizing signal generating means and said selection means transmitting said synchronizing signal in response thereto.

9. A telephony network as defined in claim 1 wherein said control module further includes means for performing a test operation in connection with a selected interface module including:

A. means for generating a test signal having a selected pattern,

B. means connected to said test signal generating means for transmitting the test signals to the voice signals receiving means of the selected interface module, and C. means for receiving the transposed voice signal from said control module that is directed to the selected interface module by the control module, when the voice signal is to contain the test signal, and D. means connected to said receiving means for analyzing the received test signal to determine if it has the selected pattern.

10. A telephony network as defined in claim 9 wherein said highways interleave control supervisory information signals with voice signals in said second signal format, said control module further comprising:

(A) means for identifying when said control supervisory information signals are being received, and (B) a plurality of means each responsive to (i) the signals in the second signal format from one of said interface modules and (ii) said identifying means for generating an enabling signal which identifies one of said interface modules to participate in the test operation.

11. A telephony network as defined in claim 10 wherein said highways also transfer voice signals and control supervisory information signals in a plurality of channels identified by timing signals transmitted by said highways, said control supervisory information signals including a test channel identification signal which identifies the channel over which the test signal is to be transferred, said control module further comprising:
   A. channel identification timing means responsive to the timing signals from the highways for generating a channel identification signal which identifies the channels;
   B. decoding means responsive to said channel identification signal for generating an enabling signal when said test channel identification signal is being transmitted over the highway, and
   C. means responsive to said decoding means and the control information signals from said highways for storing the identification of the channel in response to the signal from said test channel enabling means.

12. A telephony network as defined in claim 11 in which said test operation occurs in two channels, the test signal being transmitted to the switch in one channel and being received from the switch in the other channel, the control supervisory information signals including a transmit test identification signal and a receive test identification signal,
   A. said decoding means generating a receive enabling signal when said receive channel identification is being transmitted over the highway and a transmit enabling signal when said transmit channel identification is being transmitted over the highway,
   B. means responsive to said decoding means and the control information signals from said highways for storing the identification of the receive channel in response to the receive signal from said test channel enabling means, and
   C. means responsive to said decoding means and the control information signals from said highways for storing the identification of the transmit channel in response to the transmit signal from said test channel enabling means.

13. A telephony network as defined in claim 12 further comprising a second control module redundant with the first control module for controlling the interface modules, and said supervisory information signals include a control module selection signal for selecting the first or second control module to control the interface, said decoding means being further responsive to said channel identification signal for generating a module selection time signal when said control module selection signal is being transmitted over the highway, each said control module further including means responsive to said decoding means and the control information signals from said highways to control the selection of the first or second control module to control the interface modules.

14. An interface unit for use in a telephony network comprising a plurality of subscriber lines each connected to one of a plurality of remote concentrator means which is in turn connected for transferring digital voice signals to a central office over a plurality of communications links in a first digital signal format, the central office including a plurality of highways for transferring highway timing signals and digital voice signals in a second digital signal format, and an interface unit for coupling the digital voice signals between the communications links and the highways, the interface unit comprising a plurality of interface modules and a control module for controlling all of the interface modules in tandem, in which:
   A. each interface module is adapted to be connected to one communications link and one highway and includes:
      (i) communications link receiving means for receiving the digital voice signals in said first digital signal format from a communications link, said receiving means including receiving timing means for generating communications link timing signals in response to the received digital voice signals for controlling the reception of the digital voice signals from said communications link;
      (ii) transposing means connected to said communications link receiving means and adapted to be connected to a highway for transposing the received digital voice signals from the first digital signal format to the second digital signal format in response to the communications link timing signals from the highway;
      (iii) highway transmitting means connected to said transposing means for transmitting digital voice signals from said transposing means over a highway;
      (iv) highway receiving means connected to said control module and adapted to be connected to a highway for receiving highway timing signals and voice signals in the second digital signal format and for transmitting them to the control module; and
      (v) communications link transmitting means connected to said control module and adapted to be connected to a communications link is connected for receiving digital voice signals in the first digital signal format from said control module and for transmitting them over the communications link;
   B. said control module including:
      (i) control module receiving means connected to said highway receiving means of all of said interface modules and to one of said highways for receiving said digital voice signals in said second digital signal format from all of said interface modules and said highway timing signals from said one highway;
      (ii) control module transposing means connected to said control module receiving means and all of said communications link transmitting means for transposing the digital voice signals from said second to said first digital signal format in response to the highway timing signals and for transmitting the transposed digital voice signals to respective ones of said communications link transmitting means for transmission over said communications link.

* * * * *